United States Patent [19]
Mizikovsky

[11] Patent Number: 5,748,734
[45] Date of Patent: May 5, 1998

[54] CIRCUIT AND METHOD FOR GENERATING CRYPTOGRAPHIC KEYS

[75] Inventor: Semyon Mizikovsky, Morganville, N.J.

[73] Assignee: Lucent Technologies Inc., Murray Hill, N.J.

[21] Appl. No.: 626,734

[22] Filed: Apr. 2, 1996

[51] Int. Cl.$^6$ .................... H04L 9/08; H04L 9/00
[52] U.S. Cl. .................... 380/21; 380/44; 380/46; 380/49
[58] Field of Search ............... 380/9, 21, 44, 380/45, 46, 47, 48, 49, 50; 364/717, 717.01, 717.02, 717.03, 717.04, 717.05, 717.06, 717.07; 331/78

[56] References Cited

U.S. PATENT DOCUMENTS 4,876,716  10/1989  Okamoto .................... 380/21
5,530,959   6/1996  Amrany ...................... 380/48

*Primary Examiner*—Bernarr E. Gregory

[57] ABSTRACT

A circuit for, and method of, generating a cryptographic key at a communications node. The circuit includes: (1) communications circuitry for communicating a first seed during a first communications session and communicating a second seed during a second communications session temporally separated from the first communications session and (2) processor circuitry for creating the cryptographic key from the first and second seeds, the communicating of the first and second seeds occurring during the temporally-separated first and second communications sessions, respectively, thereby to enhance a privacy of the cryptographic key.

35 Claims, 3 Drawing Sheets

CIRCUIT AND METHOD FOR GENERATING CRYPTOGRAPHIC KEYS

TECHNICAL FIELD OF THE INVENTION

The present invention is directed, in general, to cryptography and, more specifically, to a circuit and method for generating cryptographic keys.

BACKGROUND OF THE INVENTION

Preserving the privacy of information communicated between parties continues to provide a major challenge for today's communications systems. Some systems encrypt information before transmission so it is unreadable, except to a party possessing an appropriate cryptographic key. Thus it is paramount to the success of the cryptographic system to preserve the secrecy of the cryptographic key.

In general, encryption works as follows: a sending party encrypts information ("plaintext") with an encryption key, transforming the plaintext into "ciphertext;" the sending party then transmits the cyphertext to a receiving party. The receiving party decrypts the ciphertext with a corresponding decryption key, thereby transforming the encrypted information back into its original, readable form. An eavesdropper wishing to intercept and decrypt the cyphertext must either try to obtain the key or to recover the plaintext without using the key. In a secure cryptosystem, the plaintext cannot be recovered from the ciphertext in a practical amount of time, except through use of the decryption key.

Secret key cryptography is based on the sender and receiver of a message knowing and using the same key: the sender uses the secret key to encrypt the message; the receiver uses the same secret key to decrypt the message. A well-known and widely-used secret key cryptosystem is the Data Encryption Standard ("DES").

A significant challenge for cryptosystems is how to enable the sending and receiving parties to create, share and store the secret key without a potential eavesdropper discovering it (so-called "key management"). Any third party who intercepts the key during transmission or infiltrates a database holding the key can later read all messages encrypted with that key, nullifying the benefits of encryption.

Public key cryptography solves the key management problems of secret key cryptography. In public key cryptography, the receiving party generates a pair of different keys: the "public key" and the "private key." The sending party encrypts information using the receiving party's public key. Only the receiving party's private key can decrypt the information. Thus, the need for the sender and receiver to share secret keys is eliminated. Communication between the parties involves only public keys and cyphertext; therefore, no private key is ever transmitted or shared. A widely known public-key cryptosystem is the Rivest-Shamir-Aldleman ("RSA") algorithm.

Given the inherent insecurity of wireless communication, it has been long felt that encryption of wireless communications would be highly advantageous. Unfortunately, a primary disadvantage of public-key cryptography is speed; secret key cryptosystems are generally significantly faster. Therefore, because encryption speed is often a critical factor in communications systems, it is apparent that secret key cryptosystems are currently most appropriate for communications systems.

It is generally considered unwise to transmit a secret key over an insecure channel, such as a wireless channel. Further, it may be naive to assume that landline channels are completely secure. Therefore, in the past, a user desiring to activate a mobile communications node (such as a wireless telephone) was required to transport the mobile node physically to a site (usually that of a carrier's agent or dealer) where a human representative manually entered the secret key into the mobile node. Besides the obvious disadvantage of requiring the user to travel, this prior art method suffered from two additional disadvantages. First, the representative was required to enter a sequence of perhaps 26 digits into the mobile node's keypad. Although the sequence included verification digits, a keypunch error required complete reentry and therefore was tedious. Second, the representative knew the sequence and might therefore be tempted to disclose the sequence to a potential eavesdropper.

A currently-proposed procedure addresses some of these deficiencies. Under the procedure, secret keys would be transmitted to a mobile node thus: a user desiring to activate the mobile node places a call to the carrier's agent. After verifying the user's credit and other information and after downloading required identification information to the mobile node, public encryption keys are exchanged, allowing transmission of a public-key (for instance, RSA) encrypted secret key to the mobile node. Once decrypted, the secret key is available for encrypting the mobile node's transmissions.

While this proposed procedure employs both secret- and public-key cryptography systems, key management under this procedure still suffers from several disadvantages. First, implementing the key exchange and the RSA algorithm demands significant processing power. Second, the cryptography system may be required to implement multiple algorithms (e.g., RSA, CAVE and ORYX) for the secure transfer of information, cryptography and authentication. Third, RSA imposes heavy licensing royalties on their algorithm. Fourth, a potential eavesdropper may still steal the private key stored at a local site. Finally, since the encrypted message is within an RSA digital envelope, the procedure is subject to the speed deficiencies of public key cryptosystems.

SUMMARY OF THE INVENTION

To address the above-discussed deficiencies of the prior art, a first aspect of the present invention provides a circuit for, and method of, generating a cryptographic key at a communications node. The circuit includes communications circuitry for communicating a first seed during a first communications session and communicating a second seed during a second communications session temporally separated from the first communications session. The circuit further includes processor circuitry for creating the cryptographic key from the first and second seeds. The communicating of the first and second seeds occurs during the temporally-separated first and second communications sessions, respectively, to enhance the privacy of the cryptographic key.

The present invention introduces the broad concept communicating cryptographic key seeds in lieu of communicating the key itself, either in plaintext or cyphertext. Cryptographic keys are independently generated at different communications nodes, rather than being generated at one node and transmitted to the other. Further, the seeds are communicated over multiple communications sessions rather than over a single session. As will be shown, the seeds are highly random.

For purposes of the present invention, "communications node" is defined broadly to mean any equipment whatsoever capable of conducting communications, including (in the case of telecommunications) both wired and wireless terminals, central office equipment and wireless base stations and (in the case of computer networks) client, peer and server systems and network communications resources. The present invention is thus fully employable in both telecommunications and computer systems.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
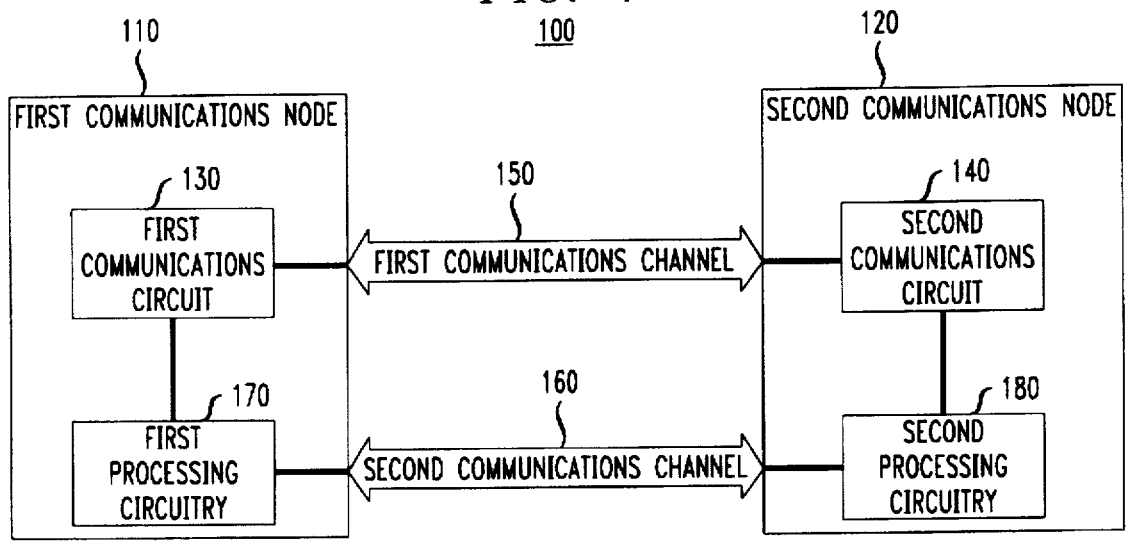
FIG. 1 illustrates a block diagram of first and second communications nodes employing an embodiment of the present invention.

Referring initially to FIG. 1, illustrated is a block diagram of first and second communications nodes 110, 120 employing an embodiment of the present invention. The illustrated embodiment includes circuit 100 for independently generating cryptographic keys at first and second communications nodes 110, 120. First and second communications nodes 110, 120 are typically positioned at remote locations within a communications network (not shown).

Circuit 100 generally comprises communications circuitry and processor circuitry distributed between first and second communications nodes 110, 120. The communications circuitry comprises first communications circuit 130 located in first communications node 110 and second communications circuit 140 located in second communications node 120.

First communications circuit 130 transmits a first seed from first communications node 110 to second communications node 140 during a first communications session. The first seed is transmitted over first communications channel 150. Second communications circuit 140 receives and stores the first seed. Second communications circuit 140, then, transmits a second seed from second communications node 120 to first communications node 110 during a second communications session. The second seed is transmitted over second communications channel 160. First communications circuit 110 receives and stores the second seed. The first communications session is temporally separated from the second communications session to decrease a probability of both sessions being intercepted by an eavesdropper. Thus, in the illustrated embodiment, separate physical or virtual channels are employed to carry the first and second communications sessions.

The processor circuitry comprises first processing circuitry 170 located in first communications node 110 and second processing circuitry 180 located in second communications node 120. First and second processing circuitry 170, 180 independently generate cryptographic keys from the first and second seeds at first and second communications nodes, 110, 120, respectively. Therefore, the communications and processor circuitry are partitioned into each of first and second communications nodes 110, 120.

Although the present invention is completely independent of the particular manner in which the cryptographic keys are generated from the first and second seeds, the general formula by which the keys are generated is:

$$K = F(S_1, S_2)$$

where:

K is the cryptographic key, $S_1$ is the first seed and $S_2$ is the second seed.

Thus, it can be seen that K is a function of $S_1$ and $S_2$. The function may be mathematical, logical or a combination of the two.

The transmission of the first and second seeds during the temporally-separated first and second communications sessions and the subsequent independent generation of the cryptographic keys at first and second communications nodes 110, 120 enhances the privacy of the cryptographic keys.

Additionally, first and second processing circuitry 170, 180 preferably independently generate verification data (e.g. in the form of a number). The verification data are transmitted between first and second communications circuitry 130, 140 and stored. First and second processing circuitry 170, 180 verify the cryptographic keys at first and second communication nodes 110, 120 to further enhance the security of the cryptographic keys. While the verification data confirms the cryptographic keys, a potential eavesdropper cannot reconstruct either the seeds or the cryptographic keys from the verification data.

Again, although the present invention is completely independent of the particular manner in which the verification data are generated from the first and second seeds, the general formula by which the verification data are generated is:

$$V = F(S_1, S_2)$$

where:

V is the verification data, $S_1$ is the first seed and $S_2$ is the second seed.

Thus, it can be seen that, like K, V is also a function of $S_1$ and $S_2$. Given a unique $S_1$ and $S_2$, unique K and V are preferably generated. For the verification data to perform their intended function, the formula employed to generate the cryptographic keys and verification data should be such that the cryptographic keys can be taken as identical if the verification data are identical.

Figure 2:
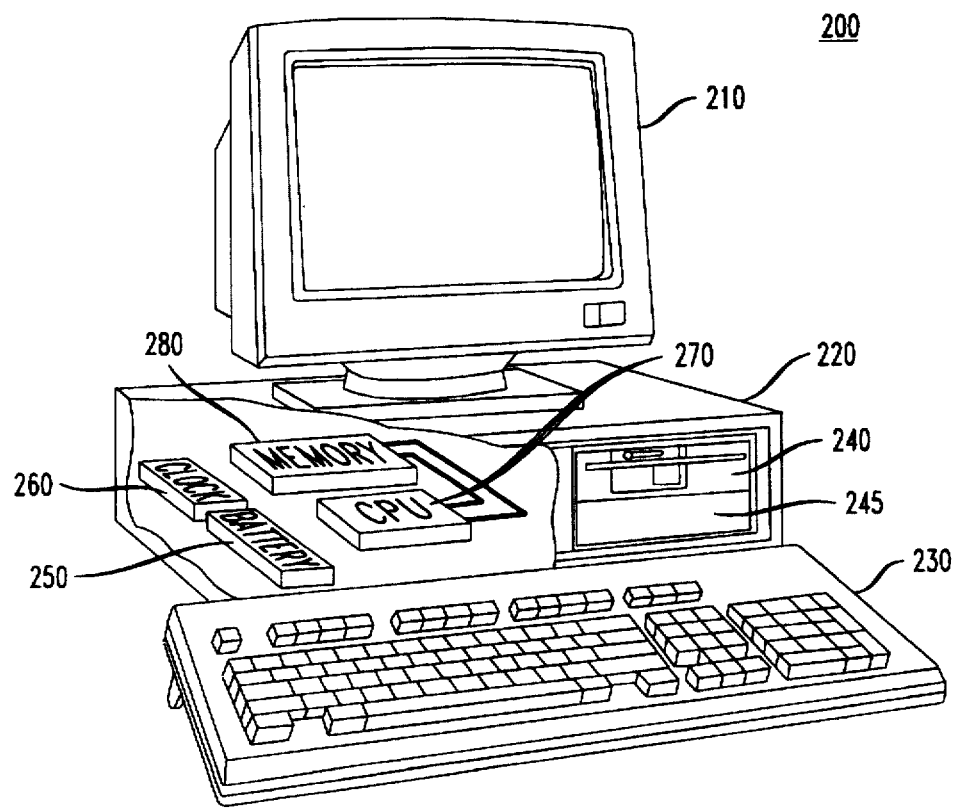
FIG. 2 illustrates an isometric view of a computer system operating as a communications node.

Turning now to FIG. 2, illustrated an isometric view of computer system 200 operating as a communications node. The computer system 200 may be a conventional personal computer ("PC"), such as an AT&T Globalyst 3356, model no. 1006, available from NCR, located in Dayton, Ohio, U.S.A., for example. Alternatively, the communications node may take the form of a wireless terminal.

Computer system 200 includes monitor 210, chassis 220 and keyboard 230. Alternatively, monitor 210 and keyboard 230 may be replaced by other conventional output and input devices, respectively. Chassis 220 includes both floppy disk drive 240 and hard disk drive 245. Floppy disk drive 240 is employed to receive, read and write to external disks; hard disk drive 245 is employed for fast access storage and retrieval. Floppy disk drive 240 may be replaced by or combined with other conventional structures to receive and transmit data and instructions, including without limitation, tape and compact disc drives, telephony systems and devices (including videophone, paging and facsimile technologies), and serial and parallel ports.

Chassis 220 is illustrated having a cut-away portion that includes battery 250, clock 260, central processing unit ("CPU") 270 and memory storage device 280. The processing circuitry of the present invention is embodied in CPU 270 and the communications circuitry of the present invention is embodied in CPU 270 in combination with memory storage device 280. Although computer system 200 is illustrated having a single CPU 270, hard disk drive 245 and memory storage device 280, computer system 200 may be equipped with a plurality of CPUs and peripheral devices.

It should be noted that any conventional computer system having at least one CPU that is suitable to function as one of a communications node may be replaced, or be utilized in conjunction with, computer system 200, including without limitation, videophones, telephones, televisions, sophisticated calculators, and hand-held, laptop/notebook, mini, mainframe and supercomputers, including RISC and parallel processing architectures, as well as within computer system network combinations. Conventional computer system architecture is more fully discussed in *Computer Organization and Architecture*, by William Stallings, MacMillan Publishing Co. (3rd ed. 1993) and incorporated herein by reference. Alternative computer system embodiments may be firmware-or hardware-based.

Figure 3:
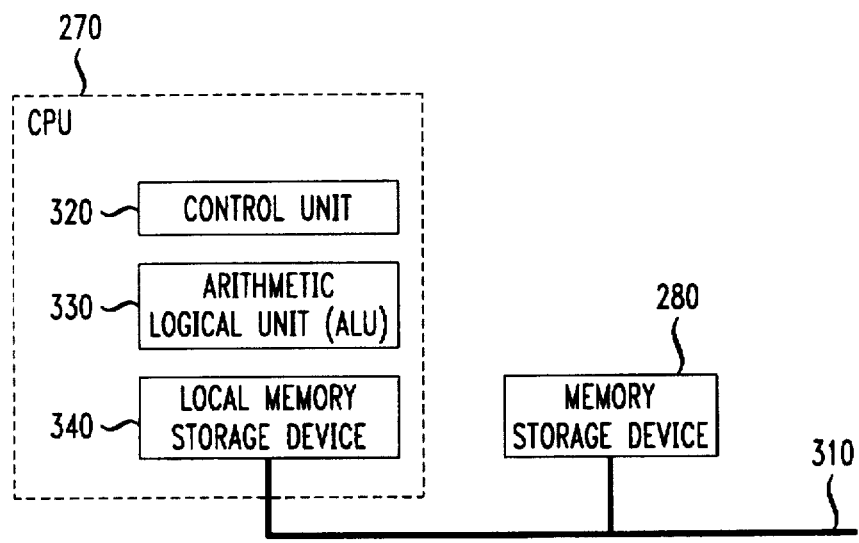
FIG. 3 illustrates a schematic block diagram of the CPU of FIG. 2 incorporating an embodiment of the present invention.

Turning now to FIG. 3, illustrated is a schematic block diagram of CPU 270 of FIG. 2 incorporating an embodiment of the present invention. CPU 270 is coupled to memory storage device 280 by data bus 310. Memory storage device 280 stores data and instructions that CPU 270 uses to execute the functions necessary to operate computer system 200. Memory storage device 280 may be any conventional memory storage device. CPU 270 includes control unit 320, arithmetic logic unit ("ALU") 330 and local memory storage device 340 (e.g. stackable cache, a plurality of registers, etc.). Control unit 320 fetches the instructions from memory storage device 280. ALU 330, in turn, performs a plurality of operations, including addition and Boolean AND, necessary to carry out the instructions fetched from memory storage device 280. Local memory storage device 340 provides a local high speed storage location for storing temporary results and control information generated and employed by ALU 330. Again, the processing circuitry of the present invention is embodied in CPU 270 and the communications circuitry of the present invention is embodied in CPU 270 in combination with memory storage device 280.

Figure 4:
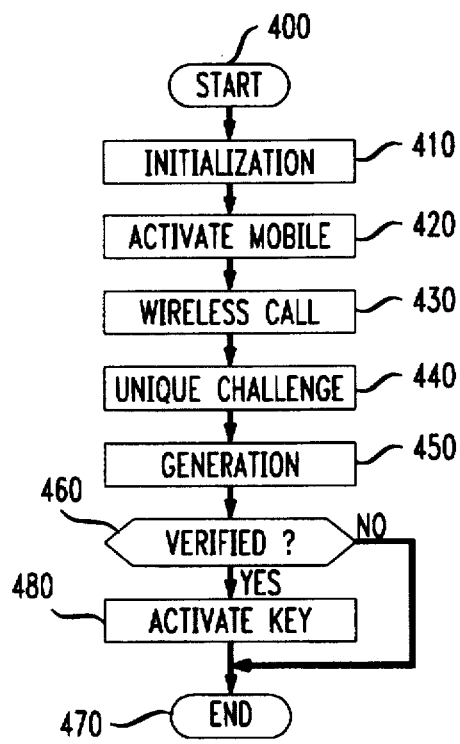
FIG. 4 illustrates a flow chart of an alternative procedure for generating a cryptographic key in a wireless telecommunications network according to the principles of the present invention.

Turning now to FIG. 4, illustrated is a flow chart of an alternative procedure for generating a cryptographic key in a wireless telecommunications network according to the principles of the present invention. Those of ordinary skill in the art will recognize that the procedure may be varied to increase or decrease security, as a particular application may require. The procedure is, also, equally employable in other communications networks (e.g. computer networks) to provide secure key management between clients and server stations.

The procedure commences at start step 400 where a new user of a mobile node (or "wireless terminal") endeavors to activate the mobile telephone. At initialization step 410, the user makes a landline call from a landline telephone in the comfort of the home or office to a subscriber center. At this time, the mobile telephone is in the presence of the user, but it is still inactive. After credit information is exchanged with the subscriber center and feature information is completed, the user is instructed to place the mobile telephone in a special mode. During activate mobile telephone step 420, the mobile telephone in the special mode displays a random decimal number $A_M$ ("a first seed") on a display of the mobile telephone. $A_M$ may be generated by processing circuitry within the mobile telephone or may be retrieved from factory-programmed memory within the mobile telephone. The user then speaks $A_M$ to the subscriber center. In response to receiving $A_M$, an activation computer having a secure database associated therewith (and later accessible by a base station) creates a random decimal number $A_B$ ("a third seed"); $A_B$ is then spoken to the user. The user is instructed to enter $A_B$ into the mobile telephone and the landline communication is terminated. At this point, both the mobile telephone and the activation computer have two of the three required seeds.

The procedure for generating the cryptographic key commences again when the user places his first wireless call via the mobile node (at wireless call step 430). Once the base station receives a request to connect the wireless call, it offers a unique challenge to the mobile node at unique challenge step 440. The base station recognizes that no cryptographic key has yet been generated for the mobile node (preferably by consulting the secure database) and therefore creates a random decimal number RANDU ("a second seed") and communicates RANDU to the mobile node. Now that the activation computer and the mobile node both possess all three seeds, the activation computer and base station independently generate (at generation step 450) a cryptographic key A-KEY and verification data AUTHU. AUTHU, as calculated by the mobile node, is then transmitted from the mobile node to the activation computer via the base station at verification decisional step 460. If the transmitted AUTHU does not match the AUTHU calculated by the activation computer (indicating that at least one of the three seeds has been corrupted), the cryptographic keys are not verified and the procedure terminates at end step 470. However, if the transmitted AUTHU matches the AUTHU at the base station, then the cryptographic keys are verified. Thus, at activate key step 480, the A-KEY is activated and the encrypted message from the mobile node can be downloaded and read using the A-KEY. Finally, the procedure for generating the cryptographic key terminates at end step 470.

In this more specific embodiment, the general formula employed to derive A-KEY and AUTHU is as follows:

$$A\text{-}KEY = F(A_M, RANDU, A_B)$$

$$AUTHU = F(A_M, RANDU, A_B)$$

where:

A-KEY is the cryptographic key,

AUTHU is the verification data,
$A_M$ is the first seed,
RANDU is the second seed and
$A_B$ is the third seed.

Again, for the authorization data to perform its function properly, the function that derives A-KEY and AUTHU should be such that, if AUTHU is identical at the base and mobile nodes, A-KEY can be taken as identical.

Figure 5:
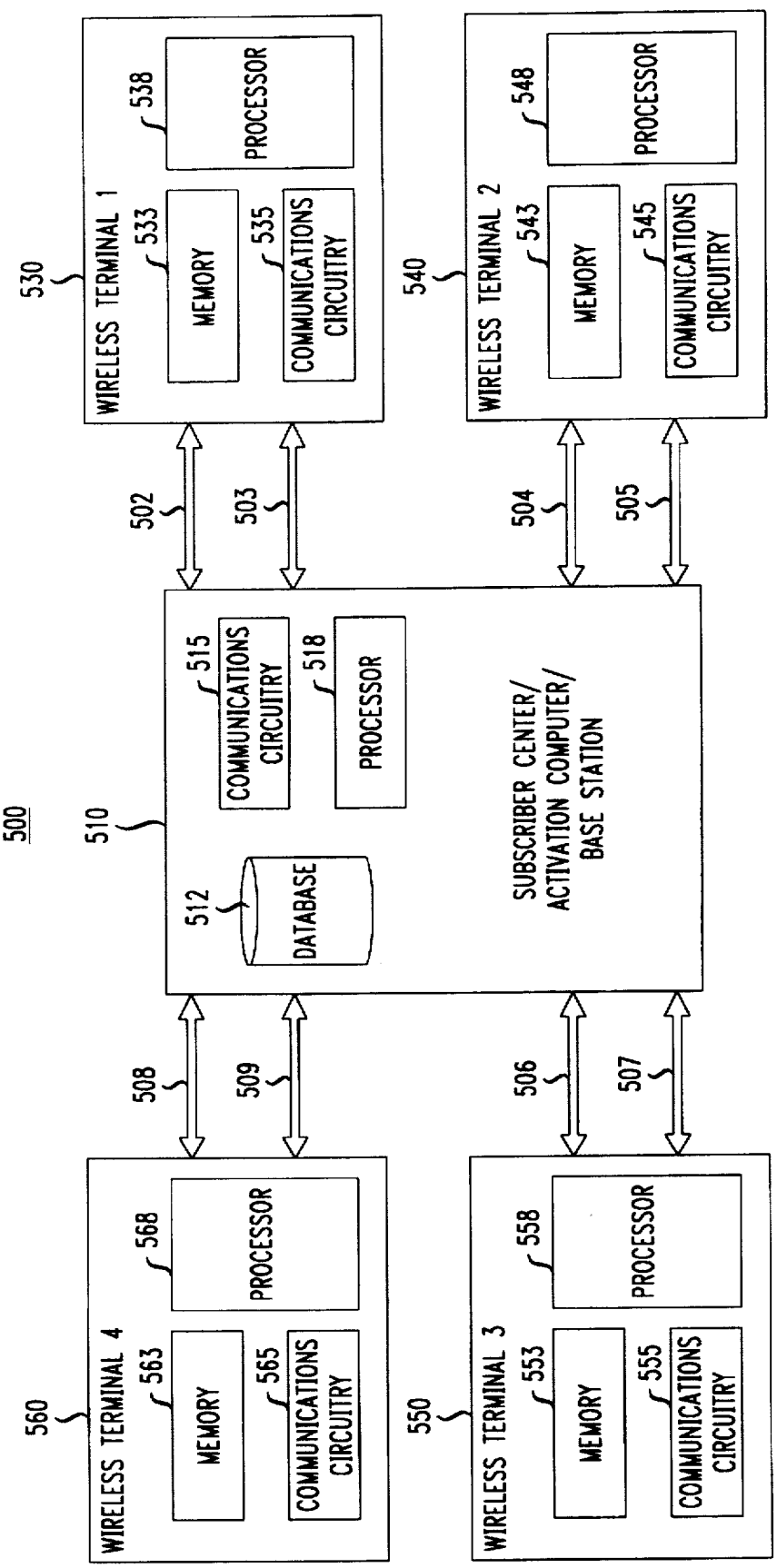
FIG. 5 illustrates a wireless communications infrastructure employing an embodiment of the present invention.

Turning now to FIG. 5, illustrated is wireless communications infrastructure 500 employing an embodiment of the present invention. Wireless communications infrastructure 500 comprises a communications network with subscriber center/activation computer/base station 510 (henceforth "base station 510") for communicating signals via wireless communications channels. Wireless communications infrastructure 500 also includes secure database 512, associated with the activation computer of base station 510, for containing cryptographic keys. The cryptographic keys permit the secure bidirectional transmission of encrypted signals between base station 510 and wireless terminals or mobile nodes 530, 540, 550, 560. Wireless terminals 530, 540, 550, 560 are coupled to base station 510 by the wireless communications channels encompassing first communication channels 502, 504, 506, 508 and second communication channels 503, 505, 507, 509. Each of wireless terminals 530, 540, 550, 560 has associated memory 533, 543, 553, 563, respectively, for storing the cryptographic key.

Wireless communications infrastructure 500 still further includes a key management system for independently generating cryptographic keys at base station 510 and wireless terminals 530, 540, 550, 560. The key management system comprises communications circuitry 515, 535, 545, 555, 565, associated with base station 510 and wireless terminals 530, 540, 550, 560, respectively, for transmitting seeds between base station 510 and wireless terminals 530, 540, 550, 560.

For instance, during a communications session between base station 510 and selected wireless terminal 530, a first and third seed are transmitted between base station 510 and selected wireless terminal 530 during a first communications session. The first seed originates from base station 510 and the third seed originates from selected wireless terminal 530. The first and third seeds are transmitted over first communications channels 502 associated with selected wireless terminal 530. Communications circuitry 515, 535, further transmits a second seed between base station 510 and selected wireless terminal 530, during a second communications session. The first communications session is temporally separated from the second communications session. The second seed is transmitted over second communications channels 503 associated with selected wireless terminal 530.

In the illustrated embodiment, the first and third seeds are each 8 to 10 digits or bits (binary) in length and the second seed is 24 digits in length. Of course, those of skill in the art understand that the lengths may be varied to accommodate the level of security desired.

The key management system still further comprises processor circuitry 518, 538, 548, 558, 568, associated with base station 510 and wireless terminals 530, 540, 550, 560, respectively. Processing circuitry 518, 538, 548, 558, 568 generates the cryptographic keys and verifications numbers, in a mathematical function, from the first, second and third seeds at both base station 510 and wireless terminals 530, 540, 550, 560. Processing circuitry 518 also stores the cryptographic key in secure database 512. Wireless terminals 530, 540, 550, 560 then transmit the verification numbers to base station 510 to verify the authenticity of the cryptographic keys at base station 510 and wireless terminals 530, 540, 550, 560.

Returning to the communications session between base station 510 and selected wireless terminal 530, processing circuitry 518, 538 associated with base station 510 and selected wireless terminal 530, independently generate a cryptographic key and verification number. The verification number is transmitted between base station 510 and selected wireless terminal 530 to verify the cryptographic key; the cryptographic key is concurrently stored in secure database 512. Once the cryptographic keys are verified, base station 510 and selected wireless terminal 530 can encrypt the encrypted signals.

Again, the transmission of the first, second and third seeds occurs during the temporally-separated first and second communications sessions, respectively, to enhance a privacy of the cryptographic keys. Moreover, the cryptographic keys are independently generated and verified to enhance the security of wireless communications infrastructure 500.

Inclusion of the wireless communication infrastructure of FIG. 5 is for illustrative purposes only. The techniques for generating cryptographic keys at remote locations in accordance with the present invention may be used in conjunction with any suitably arranged communication system for receiving communication signals, whether wired or wireless. Exemplary communication systems include, but are not limited to, telephony systems (including videophone and cellular technologies), direct television systems, processing system networks (including local and wide area networks), satellite systems, land-mobile radio systems, data storage and retrieval systems, and the like. In particular, the principles of the present invention are particularly advantageous when used in conjunction with wireless and optical communication signals.

Although selected embodiments of the present invention have been described in detail, those skilled in the art should understand that they can make various changes, substitutions and alterations herein without departing from the spirit and scope of the invention in its broadest form.

What is claimed is:

1. A circuit, associated with a communications node, for generating a cryptographic key at said communications node, comprising:

communications circuitry for communicating a first seed during a first communications session and communicating a second seed during a second communications session temporally separated from said first communications session; and processor circuitry for creating said cryptographic key from said first and second seeds, said communicating of said first and second seeds occurring during said temporally-separated first and second communications sessions, respectively.

2. The circuit as recited in claim 1 wherein said communications circuitry further communicates a third seed during said first communications session, said processor circuitry creating said cryptographic key from said first, second and third seeds.

3. The circuit as recited in claim 1 wherein said first seed is communicated over a first communications channel and said second seed is communicated over a second communications channel.

4. The circuit as recited in claim 1 wherein said second communications session is conducted over a wireless communications channel.

5. The circuit as recited in claim 1 wherein said communications circuitry comprises:

first communications circuitry for transmitting said first seed from said communications node to another communications node during said first communications session; and second communications circuitry for receiving said second seed from said other communications node during said second communications session.

6. The circuit as recited in claim 1 wherein said processor circuitry further generates verification data for verifying said cryptographic key.

7. The circuit as recited in claim 1 wherein said communications circuitry communicates verification data during said second communications session.

8. The circuit as recited in claim 1 wherein said first seed is 8 to 10 digits in length and said second seed is 24 digits in length.

9. The circuit as recited in claim 1 wherein said communications node is a mobile node of a wireless telecommunications network.

10. The circuit as recited in claim 1 wherein said communications node is a client in a computer network.

11. A method of generating a cryptographic key at a communications node, comprising the steps of:

communicating a first seed during a first communications session and communicating a second seed during a second communications session temporally separated from said first communications session; and creating said cryptographic key from said first and second seeds, said communicating of said first and second seeds occurring during said temporally-separated first and second communications sessions, respectively.

12. The method as recited in claim 11 further comprising the steps of:

further communicating a third seed during said first communications session; and creating said cryptographic key from said first, second and third seeds.

13. The method as recited in claim 11 wherein said step of communicating comprises the steps of:

communicating said first seed over a first communications channel; and communicating said second seed over a second communications channel.

14. The method as recited in claim 11 wherein said step for communicating comprises the step of conducting said second communications session over a wireless communications channel.

15. The method as recited in claim 11 wherein said step of communicating comprises the steps of:

transmitting said first seed from said communications node to another communications node during said first communications session; and receiving said second seed from said other communications node during said second communications session.

16. The method as recited in claim 11 further comprising the step of further generating verification data for verifying said cryptographic key.

17. The method as recited in claim 11 wherein said step of communicating further comprises the step of communicating verification data during said second communications session.

18. The method as recited in claim 11 wherein said step of communicating comprises the steps of:

communicating a first seed of 8 to 10 digits in length; and communicating a second seed of 24 digits in length.

19. The method as recited in claim 11 wherein said communications node is a mobile node of a wireless telecommunications network.

20. The method as recited in claim 11 wherein said communications node is a client in a computer network.

21. A circuit for independently generating cryptographic keys at first and second communications nodes, comprising:

communications circuitry for transmitting first and third seeds between said first and second communications nodes during a first communications session over a first communications channel and transmitting a second seed between said first and second communications nodes during a second communications session temporally separated from said first communications session and over a second communications channel separate from said first communications channel; and processor circuitry for generating verification data and said cryptographic keys from said first, second and third seeds at both said first and second communications nodes, said processor circuitry employing said verification data during said second communications session to verify said transmitting of said first, second and third seeds, said transmitting of said first and second seeds occurring during said temporally-separated first and second communications sessions and over said separate first and second communications channels, respectively.

22. The circuit as recited in claim 21 wherein said second communications channel is a wireless communications channel.

23. The circuit as recited in claim 21 wherein said first seed is 8 to 10 digits in length and said second seed is 24 digits in length.

24. The circuit as recited in claim 21 wherein said first communications node is a mobile node of a wireless telecommunications network and said second communications node is a base station of said wireless telecommunications network.

25. The circuit as recited in claim 21 wherein said first communications node is a client in a computer network and said second communications node is a server in said computer network.

26. A method of independently generating cryptographic keys at first and second communications nodes, comprising the steps of:

transmitting first and third seeds between said first and second communications nodes during a first communications session over a first communications channel;

transmitting a second seed between said first and second communications nodes during a second communications session temporally separated from said first communications session and over a second communications channel separate from said first communications channel; and generating verification data and said cryptographic keys from said first, second and third seeds at both said first and second communications nodes, said verification data employed during said second communications session to verify said transmitting of said first, second and third seeds, said transmitting of said first and second seeds occurring during said temporally-separated first and second communications sessions and over said separate first and second commnunications channels, respectively.

27. The method as recited in claim 26 wherein said second communications channel is a wireless communications channel.

28. The method as recited in claim 26 wherein said first seed is 8 to 10 digits in length and said second seed is 24 digits in length.

29. The method as recited in claim 26 wherein said first communications node is a mobile node of a wireless telecommunications network and said second communications node is a base station of said wireless telecommunications network.

30. The method as recited in claim 26 wherein said first communications node is a client in a computer network and said second communications node is a server in said computer network.

31. A wireless infrastructure, comprising:
- a communications network having a base station for communicating signals via wireless communications channels;
- a database, associated with said base station, for containing cryptographic keys, said cryptographic keys allowing transmission of encrypted signals from said base station;
- a plurality of wireless terminals coupled to said base station via said wireless communications channels to allow communication of signals therebetween, each of said plurality of wireless terminals having a memory associated therewith for storing a cryptographic key allowing transmission of encrypted signals from said each of said plurality of wireless terminals to said base station; and
- a key management system for independently generating cryptographic keys at said base station and a selected one of said plurality of wireless terminals, comprising:
  communications circuitry, associated with said base station and said selected one of said plurality of wireless terminals, for transmitting a first seed between said base station and said selected one of said plurality of wireless terminals during a first communications session and transmitting a second seed between said base station and said selected one of said plurality of wireless terminals during a second communications session temporally separated from said first communications session, and
  processor circuitry, associated with said base station and said selected one of said plurality of wireless terminals, for generating said cryptographic keys from said first and second seeds at both said base station and said selected one of said plurality of wireless terminals and storing one of said cryptographic keys in said database, said transmitting of said first and second seeds occurring during said temporally-separated first and second communications sessions, respectively.

32. The infrastructure as recited in claim 31 wherein said communications circuitry further transmits a third seed between said base station and said selected one of said plurality of wireless terminals, said first seed originating at said selected one of said plurality of wireless terminals and said third seed originating at said base station, said processor circuitry generating said cryptographic keys from said first, second and third seeds at both said base station and said selected one of said plurality of wireless terminals.

33. The infrastructure as recited in claim 31 wherein said communications circuitry transmits said first seed over a wired first communications channel and said second seed over a wireless second communications channel.

34. The infrastructure as recited in claim 31 wherein said communications circuitry communicates verification data between said base station and said selected one of said plurality of wireless terminals during said second communications session.

35. The infrastructure as recited in claim 31 wherein said first seed is 8 to 10 digits in length and said second seed is 24 digits in length.

* * * * *